United States Patent
Vinoth Kannan

(10) Patent No.: US 10,480,229 B2
(45) Date of Patent: Nov. 19, 2019

(54) ROTARY HINGE ASSEMBLY

(71) Applicant: Ford Global Technologies, LLC, Dearborn, MI (US)

(72) Inventor: S. Vinoth Kannan, Chennai (IN)

(73) Assignee: Ford Global Technologies, LLC, Dearborn, MI (US)

( * ) Notice: Subject to any disclaimer, the term of this patent is extended or adjusted under 35 U.S.C. 154(b) by 101 days.

(21) Appl. No.: 15/873,239

(22) Filed: Jan. 17, 2018

(65) Prior Publication Data

US 2018/0230725 A1 Aug. 16, 2018

(30) Foreign Application Priority Data

Feb. 13, 2017 (IN) .............................. 201741005122

(51) Int. Cl.
| | | |
|---|---|---|
| *E05D 11/08* | (2006.01) | |
| *B60J 5/04* | (2006.01) | |
| *E05F 5/02* | (2006.01) | |
| *F16F 9/14* | (2006.01) | |

(52) U.S. Cl.
CPC .............. *E05D 11/082* (2013.01); *B60J 5/047* (2013.01); *E05F 5/025* (2013.01); *F16F 9/145* (2013.01); *E05Y 2201/254* (2013.01); *E05Y 2201/266* (2013.01); *E05Y 2900/50* (2013.01)

(58) Field of Classification Search
CPC ......... E04D 11/082; B60J 5/047; E05F 5/025; E05Y 2201/254; E05Y 2201/256; E05Y 2201/266; E05Y 2900/50; E05Y 2900/531
See application file for complete search history.

(56) References Cited

U.S. PATENT DOCUMENTS

| 2,286,516 | A | * | 6/1942 | Swanson | .................... | B64C 9/02 |
| | | | | | | 137/493 |
| 2,434,524 | A | * | 1/1948 | Swanson | .................... | E05F 3/20 |
| | | | | | | 16/54 |
| 2,490,258 | A | * | 12/1949 | Diebel | ....................... | E05F 3/20 |
| | | | | | | 16/54 |
| 2,493,117 | A | * | 1/1950 | Diebel | ....................... | E05F 3/20 |
| | | | | | | 16/58 |

(Continued)

OTHER PUBLICATIONS

Information and Precautions, Dampers, 2 pages, Bansbach Easylift of North America, Inc., www.damper.net/information-dampers.php, Nov. 15, 2016.

*Primary Examiner* — Victor D Batson
*Assistant Examiner* — Matthew J Sullivan
(74) *Attorney, Agent, or Firm* — Vichit Chea; Price Heneveld LLP

(57) ABSTRACT

A rotary hinge assembly includes a fluid chamber filled with a fluid and a constricted section with a throat area which is tunable by a throat tuner to control the fluid flow passing through the constricted section. Within the fluid chamber, a rotary connecting pin is mounted so that a first longitudinal end of the pin is connected to a door, and a second longitudinal end of the pin is concentrically and rotatably mounted within the fluid chamber. On the second longitudinal end, a vane is connected and adapted to rotate for displacing the fluid present in the fluid chamber towards the constricted section, when the rotary connecting pin undergoes the rotational movement in response to opening and closing of the door.

20 Claims, 6 Drawing Sheets

(56) References Cited

U.S. PATENT DOCUMENTS

| | | | | |
|---|---|---|---|---|
| 2,493,118 A * | 1/1950 | Diebel | | E05F 3/20 |
| | | | | 16/82 |
| 3,952,365 A | 4/1976 | Grisebach | | |
| 4,411,341 A * | 10/1983 | Schultz | | F16F 9/145 |
| | | | | 16/57 |
| 5,152,189 A * | 10/1992 | Miura | | F16F 9/145 |
| | | | | 464/180 |
| 6,154,924 A * | 12/2000 | Woo | | E05F 3/14 |
| | | | | 16/62 |
| 6,725,984 B2 * | 4/2004 | Orita | | E05F 5/10 |
| | | | | 188/290 |
| 7,243,398 B2 * | 7/2007 | Salice | | E05F 5/00 |
| | | | | 16/341 |
| 7,353,923 B2 * | 4/2008 | Seto | | E05F 5/10 |
| | | | | 188/290 |
| 7,357,231 B2 * | 4/2008 | Kim | | E05F 3/14 |
| | | | | 188/290 |
| 7,850,219 B2 | 12/2010 | Townson et al. | | |
| 8,096,393 B2 * | 1/2012 | Saito | | F16F 9/145 |
| | | | | 188/290 |
| 8,104,823 B2 | 1/2012 | Kohlstrand | | |
| 8,516,657 B2 * | 8/2013 | Yoshida | | A47K 13/12 |
| | | | | 16/50 |
| 8,745,820 B2 * | 6/2014 | Janak | | E05F 3/12 |
| | | | | 16/50 |
| 9,027,979 B2 * | 5/2015 | Ozaki | | E05F 5/025 |
| | | | | 296/50 |
| 10,221,910 B2 * | 3/2019 | Mihara | | E05F 3/20 |
| 2003/0126717 A1 * | 7/2003 | Iwashita | | A47K 13/10 |
| | | | | 16/82 |
| 2003/0204935 A1 * | 11/2003 | Kim | | E05F 3/20 |
| | | | | 16/280 |
| 2003/0234145 A1 * | 12/2003 | Iwashita | | A47K 13/12 |
| | | | | 188/290 |
| 2009/0189406 A1 * | 7/2009 | Gleason | | B60P 1/26 |
| | | | | 296/57.1 |
| 2012/0272480 A1 * | 11/2012 | Ac | | E05D 11/082 |
| | | | | 16/320 |
| 2019/0178326 A1 * | 6/2019 | Kaneko | | F16F 9/44 |

\* cited by examiner

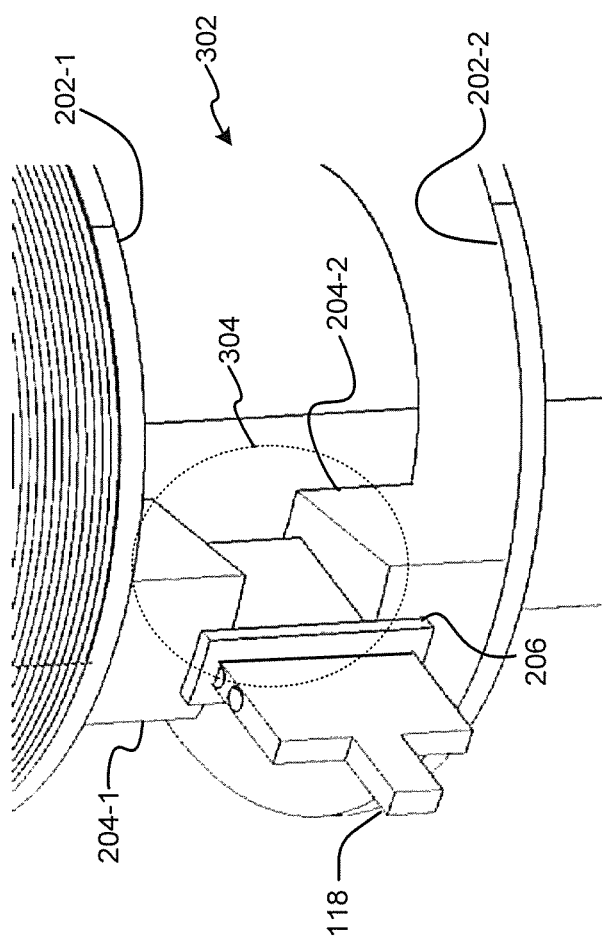

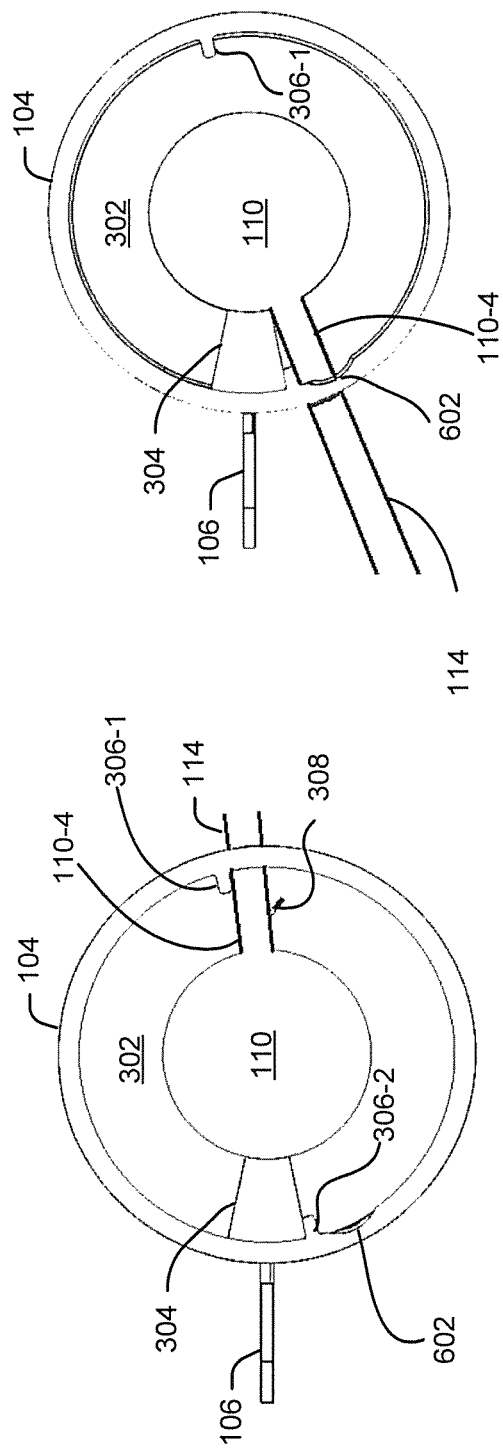

ROTARY HINGE ASSEMBLY

FIELD OF THE INVENTION

The present invention generally relates to vehicle door hinge assemblies, and more particularly to a rotary hinge assembly having a rotary damper.

BACKGROUND OF THE INVENTION

Rotary hinge assemblies which connect a vehicle door to a vehicle body are commonly equipped with a rotary damper in order to enable the vehicle door to open and close smoothly. The rotary damper generally includes a fluid filled chamber and a connecting pin rotatably supported in the chamber for rotation with respect to the chamber. One end of the pin is disposed inside the chamber and is connected to a vane which undergoes rotational movement inside the chamber, while the other end of the pin is connected to the vehicle door. The other end of the pin is connected to the vehicle door in such a way that the vane is able to gain rotational movement within the chamber in response to opening and closing of the vehicle door.

Further, when the vehicle door is opened or closed, the vane in the chamber rotates against a rotational resistance applied by the fluid present in the chamber. Such rotational resistance applied by the fluid attenuates the rotational movement of the vane or the vehicle door in order to enable the vehicle door to open and close smoothly.

An exemplary rotary damper is described in U.S. Pat. Nos. 9,027,979 and 7,243,398 which describe a rotary damper employed in a hinge of a vehicle door. The rotary damper includes a fluid filled chamber and a vane connected to the vehicle door. Such fluid filled chamber includes a fluid channel or constricted section through which the fluid has to pass, during the rotational movement of the vane in the chamber, in response to opening and closing of the vehicle door. During the passing of the fluid through the constricted section, the constricted section produces a resistive force against the rotation of the vane or the vehicle door, in order to enable the vehicle door to open and close smoothly.

However, while application of the resistive force against the rotational movement of the vehicle door is performed using the rotary damper described in the aforementioned patents, end users including driver and passengers of the vehicle may be deprived of any option of controlling the resistive force as per their requirement.

SUMMARY OF THE INVENTION

This summary is provided to introduce concepts related to rotary hinge assemblies for vehicle doors. The concepts are further described below in the detailed description. This summary is not intended to identify essential features of the claimed subject matter nor is it intended for use in determining or limiting the scope of the claimed subject matter.

In one embodiment, a rotary hinge assembly is described. The rotary hinge assembly includes a fluid chamber filled with a fluid. The fluid chamber includes a constricted section with a throat area which is tunable by a throat tuner to control the fluid flow passing through the constricted section. Within the fluid chamber, a rotary connecting pin is mounted. The rotary connecting pin has two ends including a first longitudinal end and a second longitudinal end. The first longitudinal end is connected to a door to provide the rotational movement to the rotary connecting pin in response to opening and closing of the door. The second longitudinal end is concentrically and rotatably mounted within the fluid chamber. Further, on the second longitudinal end, a vane is connected. The vane is adapted to rotate for displacing the fluid present in the fluid chamber towards the constricted section, when the rotary connecting pin undergoes the rotational movement in response to opening and closing of the door.

According to another embodiment, a vehicle door rotary hinge assembly is provided. The rotary hinge assembly includes a fluid chamber filled with fluid and comprising a constriction section with a throat area, and a throat tuner connected in the throat area to control fluid flow passing through the constriction section. The rotary hinge assembly also includes a rotary connecting pin mounted within the chamber, and a vane connected to the rotary connecting pin and rotatable to displace the fluid towards the constricted section when the rotary connecting pin rotates responsive to opening and closing of a door.

In one embodiment, a vehicle having a rotary hinge assembly is described. The door hinge includes a fixed adapter connected to a body part of the vehicle. With the fixed adapter, a toroidal fluid chamber filled with a fluid is connected. The fluid chamber includes a constricted section with a throat area which is tunable by a throat tuner to control the fluid flow passing through the constricted section. Within the fluid chamber, a rotary connecting pin is mounted. The rotary connecting pin has two ends including a first longitudinal end and a second longitudinal end. The first longitudinal end is connected to a vehicle door to provide the rotational movement to the rotary connecting pin in response to opening and closing of the vehicle door. The second longitudinal end is concentrically and rotatably mounted within the fluid chamber. Further, on the second longitudinal end, a vane is connected. The vane is adapted to rotate for displacing the fluid present in the fluid chamber towards the constricted section, when the rotary connecting pin undergoes the rotational movement in response to opening and closing of the vehicle door.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is a sectional view of a throat tuner of the rotary hinge assembly;

FIG. 6A is a top horizontal sectional view of a door in an opened position of the rotary hinge assembly; and FIG. 6B is a top horizontal sectional view of a door in a closed position of the rotary hinge assembly.

DETAILED DESCRIPTION OF THE PREFERRED EMBODIMENTS

Figure 1:
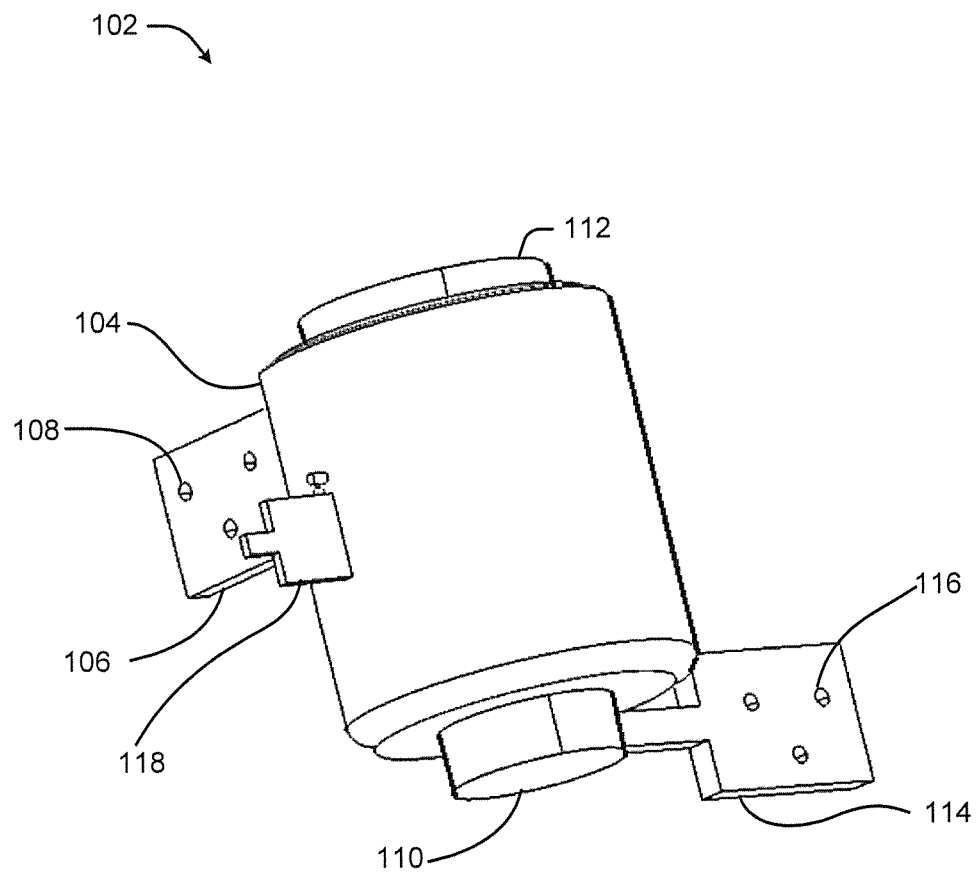
FIG. 1 is a perspective view of a rotary hinge assembly, according to one embodiment of the present disclosure.

The subject matter described herein relates to a rotary hinge assembly for doors, for example, of vehicles. The rotary hinge assembly is often used to provide soft stop positions at a fully opened position or at a fully closed position of the doors. To this end, the rotary hinge assembly generally includes a fluid chamber filled with a fluid and a rotary connecting pin. The fluid chamber may have a toroidal shape and is disposed radially with respect to the central axis of the rotary hinge assembly. Further, the fluid chamber includes a constricted section.

Further, the rotary connecting pin has two ends in lengthwise or longitudinal direction. One end of the rotary connecting pin is disposed outside the fluid chamber and is directly connected to a vehicle door, so as to provide the rotational movement to the rotary connecting pin in response to opening and closing of the vehicle door. The other end of the rotary connecting pin is disposed within the fluid chamber and includes a vane or blade which is present within the fluid chamber. The vane is adapted to move and displace the fluid towards the constricted section, when the rotary connecting pin undergoes the rotational movement in response to opening and closing of the vehicle door. While the fluid is displaced towards the constricted section by the vane, the constricted section allows the fluid to apply a resistive force against the rotation of the vane in order to enable the vehicle door to open and close smoothly. Such smooth opening and closing of the vehicle door minimizes the discomfort, which otherwise would have occurred, to an end user including the driver and passengers of the vehicle.

However, while applying the resistive force against the rotation of the vane or the vehicle door, the end user is deprived of any option of controlling the resistive force against the rotation of the vane or the vehicle door. Also, manufacturers may have to manufacture separate hinges with differing strengths for different vehicles and door types, and thus no single adjustable hinge is available to the end user.

To this end, a rotary hinge assembly for a vehicle door is described in the present disclosure. As per an embodiment of the present disclosure, the rotary hinge assembly includes a housing enclosing a fluid chamber filled with a fluid. In an example, the fluid chamber may be of toroidal shape and the fluid may be gas or liquid. The fluid may be, for example, nitrogen gas.

Further, the fluid chamber includes a constricted section with a throat area which is tunable by a throat tuner to control the fluid flow passing through the constricted section. In an example, the fluid chamber can include one or more constricted sections.

Furthermore, within the fluid chamber, a rotary connecting pin is mounted in such a way that a first longitudinal end of the rotary connecting pin is disposed outside the fluid chamber and a second end of the rotary connecting pin is concentrically and rotatably disposed inside the fluid chamber. The first longitudinal end is connected to a door in order to provide the rotational movement to the rotary connecting pin in response to opening and closing of the door. On the second longitudinal end, a vane or a blade is connected for displacing the fluid present in the fluid chamber towards the constricted section, when the rotary connecting pin undergoes the rotational movement in response to opening and closing of the door.

Thus, according to the embodiment of the present disclosure, the end user is facilitated with an option to adjust the position of the throat tuner inside the constricted section to control the throat area of the constricted section and hence the resistive force of the fluid against the rotation of the blade or the vehicle door. Such an adjustable throat tuner facilitates the end user to dampen the level of squeaking noise, raised by the fast door closing, of the vehicle door. This in turn eliminates the body rattling noise, and allows the end user to feel a soothing or ergonomic sound during closing of the vehicle door. Furthermore, since the door opening and closing speed is controlled by the end user using the throat tuner, the chances of fingers or objects struck while closing the vehicle door can be minimized or eliminated to an extent.

The above mentioned advantages and/or implementations are further described herein with reference to the accompanying figures. It should be noted that the description and figures relate to exemplary implementations, and should not be construed as a limitation to the present invention. It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

The following description relates to an exemplary embodiment of an adjustable damper or damping portion for a rotary hinge assembly for use, for example, in passenger cabins of a vehicle. It will be understood, however, that the herein described inventive concepts can be suitably utilized for other purposes and applications. It will also be readily apparent that various modifications and variations would be contemplated as within the ordinary skill of one in the field and not limited to the exemplary embodiment that is described herein. In addition, various terms are used throughout the course of the following discussion, including "top," "bottom," "inner," "outer," "distal," "proximal," "interior," "exterior," and the like. These terms are used in order to provide a suitable frame of reference in regard to the accompanying drawings and should not be regarded as overly limiting, however, except where so specifically indicated herein.

Referring to FIG. 1, a perspective view of a rotary hinge assembly 102 is shown as per an embodiment of the present disclosure. The rotary hinge assembly 102 includes a housing 104, shown having a cylindrical shape. The housing 104 is configured to operatively attach with a fixed structure using a fixed adapter 106 mounted on exterior upper side of the housing 104. The fixed adapter 106 may include one or more orifices 108 for allowing insertion therethrough of fasteners, such as bolts, to connect the fixed adapter 106 to the fixed structure. In an example, the fixed structure can include, but is not limited to, a door frame, a fixed wall, and a vehicle body.

The housing 104 is hollow from inside and is sized to define a fluid chamber (not shown in FIG. 1) having fluid filled therein. In an example, the fluid chamber can be disposed radially with respect to a central axis of the rotary hinge assembly. Further, the fluid chamber can be of toroidal shape, and the fluid can be liquid or gas. The gas can be, for example, nitrogen gas.

Yet further, in a central portion of the fluid chamber, a rotary connecting pin 110 having a mast with a first longitudinal end and a second longitudinal end is operatively mounted using a mounting device such as lock nut 112. The rotary connecting pin 110 is mounted in the housing 104 in such a way that the first longitudinal end of the rotary connecting pin 110 is disposed outside the bottom portion of the housing 104, while the second longitudinal end of the rotary connecting pin 110 is disposed inside the housing 104.

The first longitudinal end, of the rotary connecting pin 110, lying outside the bottom portion of the housing 104 is connected to a rotary adapter 114. The rotary adapter 114 is used to connect rotary connecting pin 110 along with the housing 104, or the rotary hinge assembly 102, with a door (not shown in figures) of a vehicle or any other structure. Further, similar to the fixed adapter 106, the rotary adapter 114 may include one or more orifices 116 for allowing insertion therethrough of fasteners, such as bolts, to connect the rotary adapter 114 to the door.

The second longitudinal end of the rotary connecting pin 110 includes one or more blades or vanes projecting radially outwards from the mast of the rotary connecting pin 110 up to an inner peripheral surface of the fluid chamber. With such structure, the second longitudinal end of the rotary connecting pin 110 is rotatably mounted in the fluid chamber so as to dissipate kinetic energy into the fluid present in the fluid chamber, in response to kinetic energy generated by movement of the door between an opened position and a closed position.

In accordance with an embodiment of the present disclosure, the fluid chamber includes a constricted section (not shown in FIG. 1) with a throat area which is tunable by a throat tuner 118 to control the throat area and hence the flow of the fluid passing through the constricted section. The throat tuner 118 may be a strip-like structure which is configured to be moved, positioned, and locked inside the constricted section at various positions. With such configuration of the throat tuner 118, end users of the rotary hinge assembly 102 can adjust the position of the throat tuner 118 inside the constricted section at various positions to control the throat area and hence the resistive force of the fluid against the rotation of the vane connected to the door. Such an adjustable and controllable throat tuner 118 facilitates the end user to dampen the level of squeaking noise, raised by the rapid closing, of the door. This in turn allows the end user to feel a soothing or ergonomic sound during closing of the door. Furthermore, with the implementation of the present subject matter, the end user cannot merely control the flow rate of the fluid during closing of the door but also during the opening of the door as well. Since the door opening and closing speed is controlled by the end user using the throat tuner 118, the chances of fingers or objects struck while closing the door can be minimized or eliminated to an extent.

The working and operation of the rotary hinge assembly 102 is described in detail in the following description with reference to FIGS. 2, 3, 4, 5, and 6.

Figure 2:
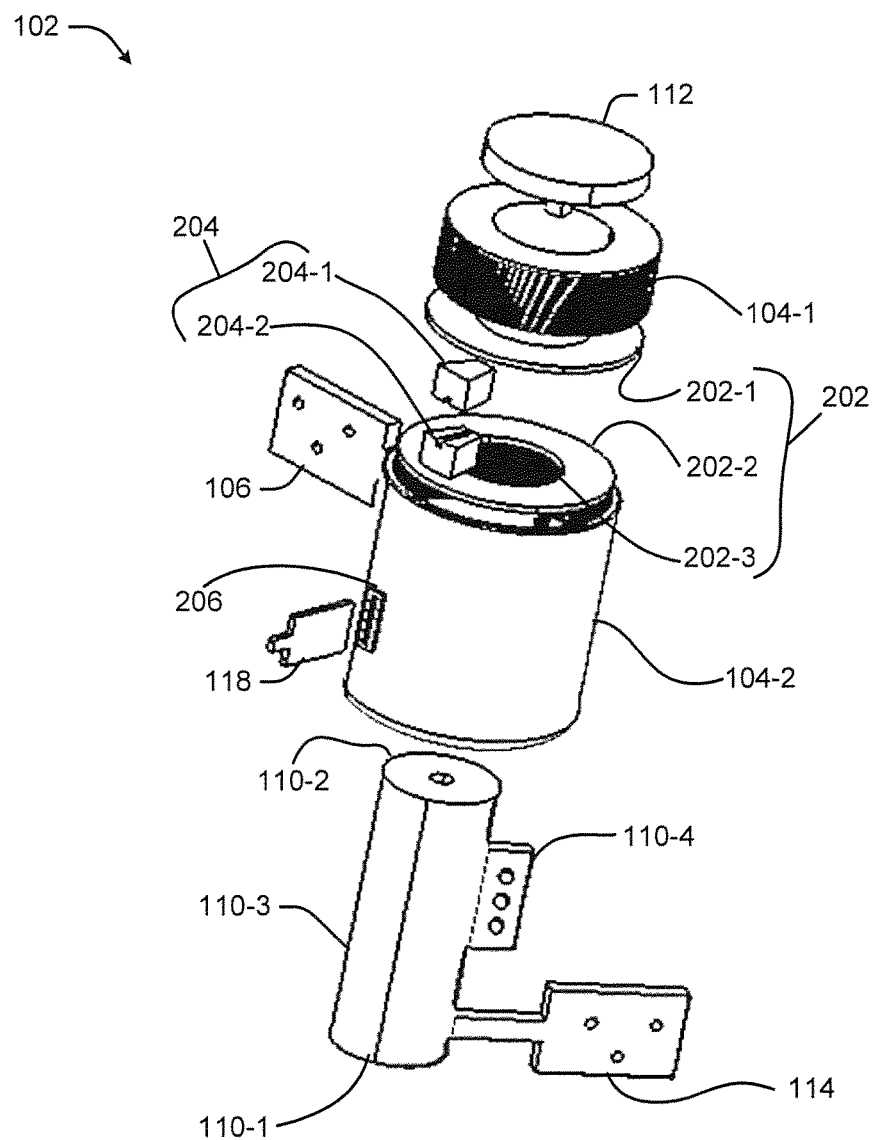
FIG. 2 is an exploded view of the rotary hinge assembly shown in FIG. 1.

FIG. 2 illustrates an exploded view of the rotary hinge assembly 102 in accordance with an embodiment of the present disclosure. The rotary hinge assembly 102 includes the housing 104 shown having a cylindrical shape. The housing 104 may have two mating half assemblies 104-1 and 104-2, which are fixedly attached to each other. The two mating half assemblies 104-1 and 104-2 are attached to each other using a circular seal 202. The circular seal 202 includes an upper seal 202-1, a lower seal 202-2, and a central open portion 202-3.

In an attached or connected position, each of the two mating half assemblies 104-1 and 104-2 are hollow and sized to enclose a fluid chamber 302 (shown in FIGS. 3-6) in between the upper seal 202-1 and the lower seal 202-2. In an example, the upper seal 202-1 acts as a top restriction for the fluid chamber 302 and the lower seal 202-2 acts a bottom restriction for the fluid chamber 302. In one example, the fluid chamber 302 is disposed radially with respect to the central axis of the housing 104. Further, the fluid chamber 302 is filled with a fluid which can be liquid or gas. The gas filled in the fluid chamber 302 can be, for example, nitrogen gas.

Further, the fluid chamber 302 can be of toroidal shape having a constricted section 304 (as shown in FIGS. 3-6) defined by an orifice gusset 204 (shown in FIG. 2) mounted in between the seal 202. The constricted section 304 has a throat area which has a narrow cross section in comparison to the cross section of the entire fluid chamber 302. By having such throat area with narrow cross section, the constricted section 304 becomes capable of generating a venturi effect on the fluid displaced towards the constricted section 304 by the vane 110-4. The venturi effect is a phenomenon that occurs when the fluid that is flowing through a pipe is forced though a narrow cross section of that pipe, resulting in a decrease in pressure applied to the fluid. Thereby, by having a venturi effect in the fluid chamber 302, a door pushed with a high force is slowed down to an optimum or required rotational speed.

Figure 3:
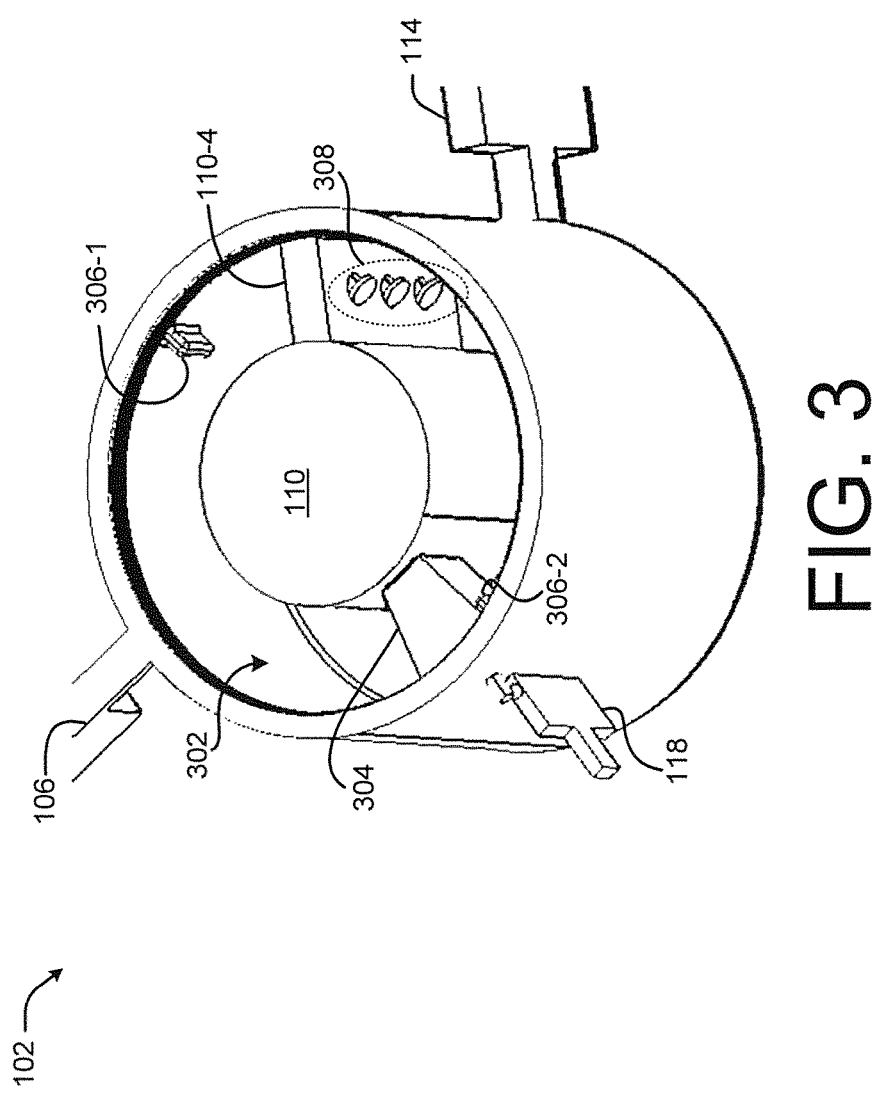
FIG. 3 is a top cross-sectional perspective view of the rotary hinge assembly.

In one embodiment as shown in FIGS. 2-4, the orifice gusset 204 includes an upper orifice gusset 204-1 and a lower orifice gusset 204-2, to define the boundaries of the constricted section 304 in the fluid chamber 302. Further, in one example, in the region of the constricted section 304 defined by the orifice gusset 204, the throat tuner 118 may be inserted through the exterior side of the housing 104 using a tuner seal 206. The tuner seal 206 is provided to seal the movement of the fluid out of the fluid chamber 302 or the housing 104. In addition to provide the sealing, the tuner seal 206 along with the orifice gusset 204 acts as a guide rail to facilitate the movement of the throat tuner 118 in the constricted section 304. In one example, the throat tuner 118 can be a strip-like structure.

Figure 5A:
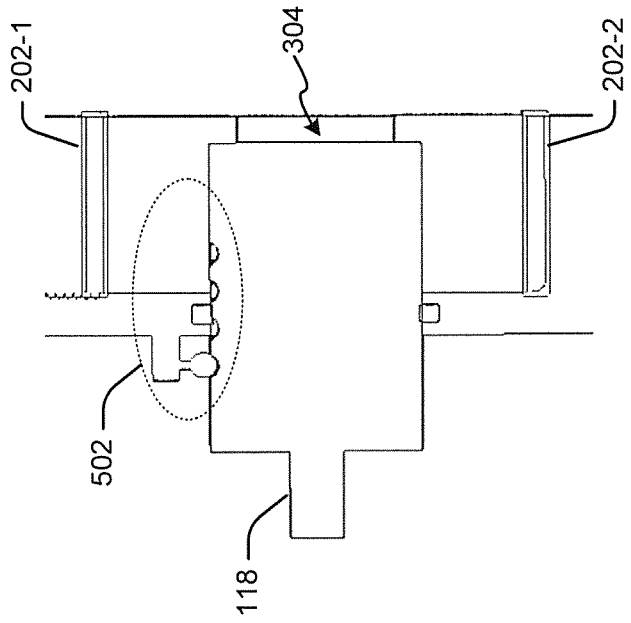
FIG. 5A is a diagram representing minimum restriction applied with the throat tuner.
Figure 5B:
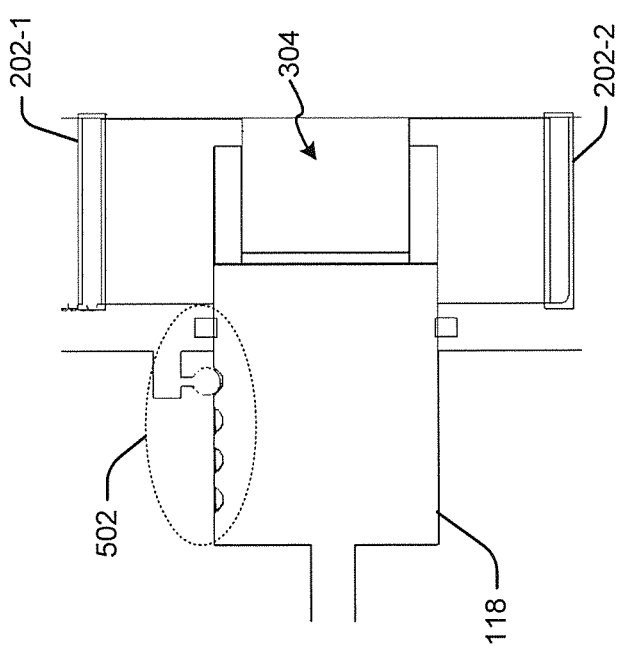
FIG. 5B is a diagram representing maximum restriction applied with the throat tuner.

Referring to FIGS. 5A and 5B, the throat tuner 118 can be guided on the guide rail for being adjusted at various positions, between a minimum restriction position (FIG. 5A) and a maximum restriction position (FIG. 5B), in the constricted section 304. The throat tuner 118 can be adjusted or positioned at various positions using a tuner lock notch or a ball-lock mechanism 502. Although the ball lock mechanism 502 is used for the throat tuner 118 in FIGS. 5A and 5B, a nut-screw mechanism, a solenoid operated mechanism, or any other suitable mechanism can be implemented to move, adjust, and lock the throat tuner 118 at the various positions within the constricted section 304.

Further, in one example, the rotary hinge assembly 102 of the present disclosure allows an end user to adjust the throat tuner 118 at the various positions within the constricted section 304. Thus, by having the throat tuner 118 adjustable at various positions within the constricted section 304, the end user can control flow of the fluid passing the constricted section 304. Such user adjustable or controllable throat tuner 118 allows the end user to select a position for the throat tuner 118 as per user's desire of having soothing or ergonomic sound during closing or opening of the door.

Returning back to FIG. 2, the central open portion 202-3 of the seal 202 or the fluid chamber 302 is configured to operatively receive the rotary connecting pin 110 inside the housing 104 to seal the fluid chamber 302 from the central open portion 202-3. The rotary connecting pin 110 includes a mast 110-3 with a first longitudinal end 110-1 and a second longitudinal end 110-2. The first longitudinal end 110-1 of the rotary connecting pin 110 is disposed outside the bottom portion of the housing 104, while the second longitudinal end 110-2 of the rotary connecting pin 110 lies within the central open portion 202-3 of the fluid chamber 302 or the circular seal 202.

The first longitudinal end 110-1 lying outside the housing 104 may be connected to the rotary adapter 114. The rotary adapter 114 is used to connect the rotary connecting pin 110 with a door (not shown in figures), in order to provide rotational movement to the rotary connecting pin 110 in response to movement of the door between an opened position (shown in FIG. 6A) and a closed position (shown in FIG. 6B).

Further, the second longitudinal end 110-2 of the rotary connecting pin 110 is concentrically and rotatably mounted or disposed inside the fluid chamber 302. In one example, the second longitudinal end 110-2 of the rotary connecting pin 110 includes a blade or a vane 110-4. The vane 110-4 can be a radially extending structure from the mast 110-3 along cylindrical inner peripheral surface of the fluid chamber 302. With such structural configuration of the vane 110-4, the vane 110-4 remains in sliding contact with the inner peripheral surface of the fluid chamber 302 while the vane 110-4 and the fluid chamber 302 undergoes relative rotation in response to the movement of the door. In an example, the vane 110-4 rotates between the opened position and the closed position defined by an open vane limiter 306-1 and a close vane limiter 306-2 mounted in the fluid chamber 302.

Yet further, the vane 110-4 may include one or more one-way valves 308. The one-way valves 308 are operatively open when the vane 110-4 is moved away from the constricted section 304 in order to open the door. With such one-way valves 308, the fluid is able to achieve a higher flow rate across the vane 110-4 during opening of the door. Such higher flow rate across the vane 110-4 during opening of the door facilitates an end user, including driver and passengers, of a vehicle with a quick egress from a passenger compartment of the vehicle. Such quick egress enhances the end users safety during emergency situations, such as vehicle collision or crash situations.

On the other hand, when the door or the vane 110-4 is to be moved towards the constricted section 304 in order to close the door, the end user can selectively adjust the level of rotational resistance against the expected flow rate of the fluid in the chamber towards the constricted section 304 by moving and adjusting the throat tuner 118 in the constricted section 304. Such adjustment allows the fluid to apply the rotational resistance against the rotational movement of the vane 110-4 in the fluid chamber 302 in order to dampen the level of squeaking noise, raised by the fast door of a vehicle closing. This in turn eliminates the body rattling noise, and allows the end user to feel a soothing or ergonomic sound during closing of the door. Also, in one example, the fluid chamber 302 includes an expanded portion 602 (FIGS. 6A and 6B) near the close vane limiter 306-2 for allowing the fluid flow during the door closed position to enhance or improve the locking of the door.

Furthermore, in addition to facilitating the improvement in the ergonomic sound to the end users, the rotary hinge assembly 102 described herein enhances the life of the structures to which the rotary hinge assembly 102 is attached or mounted. Furthermore, since the door opening and closing speed is controlled by the end users using the throat tuner 118, the chances of fingers or objects struck while closing the door can be minimized or eliminated to an extent. This in turn enhances the safety and convenience to the end users.

Although examples for the present disclosure have been described in language specific to structural features and/or methods, it should be understood that the appended claims are not necessarily limited to the specific features or methods described. Rather, the specific features and methods are disclosed and explained as examples of the present disclosure.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A rotary hinge assembly comprising:
    a fluid chamber filled with a fluid and comprising a constriction section with a throat area;
    a throat tuner comprising a strip structure connected in a region of the throat area of the constricted section, wherein the throat area is tunable by sliding the strip structure of the throat tuner to one of various positions to control fluid flow passing through the constriction section;
    a rotary connecting pin mounted within the chamber, wherein the rotary connecting pin comprises:
        a first longitudinal end configured to connect to a door of a vehicle and to provide the rotational movement to the rotary connecting pin in response to opening and closing of the door; and
        a second longitudinal end concentrically and rotatably mounted in the fluid chamber; and
    a vane connected to the second longitudinal end of the rotary connecting pin, wherein the vane rotates to displace the fluid present in the fluid chamber towards the constricted section when the rotary connecting pin undergoes the rotational movement in response to opening and closing of the door.

2. The rotary hinge assembly as claimed in claim 1, wherein the throat tuner comprises one of a nut-screw operated mechanism, a ball-lock operated mechanism, and a solenoid operated mechanism.

3. The rotary hinge assembly as claimed in claim 1, wherein the fluid chamber is disposed radially with respect to a central axis of the rotary hinge assembly, and wherein the fluid chamber comprises one or more constricted sections.

4. The rotary hinge assembly as claimed in claim 1, wherein the vane is radially extending structure along cylindrical inner peripheral surface of the fluid chamber, and wherein an outer end of the vane is in sliding contact with the inner peripheral surface of the fluid chamber, when the vane and the fluid chamber undergo relative rotation in response to closing and opening of the door.

5. The rotary hinge assembly as claimed in claim 1, wherein the vane rotates between a door opened position and a door closed position defined by an open vane limiter and a close vane limiter mounted in the fluid chamber.

6. The rotary hinge assembly as claimed in claim 5, wherein the fluid chamber comprising an expanded portion near the close vane limiter for allowing the fluid flow during the door closed position to enhance the locking of the door.

7. The rotary hinge assembly as claimed in claim 1, wherein the vane comprises a number of one-way valves to facilitate higher rate of the fluid flow during opening of the door in comparison to closing of the door.

8. The rotary hinge assembly as claimed in claim 1, further comprising a lock nut to mount the rotary connecting pin within the housing.

9. The rotary hinge assembly as claimed in claim 1, further comprising a fixed adapter to fixedly connect the housing to a fixed structure wherein the fixed structure is a vehicle body.

10. The rotary hinge assembly as claimed in claim 1, further comprising a rotary adapter to connect the first longitudinal end of the rotary connecting pin to the door.

11. The rotary hinge assembly as claimed in claim 1, wherein the housing comprising two mating half assemblies, and wherein the two mating half assemblies are hollow and sized to enclose the fluid chamber.

12. The rotary hinge assembly as claimed in claim 11, wherein the two mating half assemblies enclose the fluid chamber in between an upper seal and a lower seal disposed in the housing.

13. A vehicle door rotary hinge assembly comprising:
   a fluid chamber with fluid and comprising a constriction section with a throat area;
   a throat tuner comprising a strip structure in the throat area to control fluid flow through the constriction section by sliding the strip structure to one of various positions;
   a rotary connecting pin mounted within the chamber; and
   a vane connected to the pin and rotatable to displace the fluid towards the constricted section when the pin rotates responsive to rotation of a door.

14. The vehicle door rotary hinge assembly as claimed in claim 13, wherein the rotary connecting pin comprises:
   a first longitudinal end configured to connect to a door of a vehicle and to provide rotational movement to the rotary connecting pin in response to opening and closing of the door; and
   a second longitudinal end concentrically and rotatably mounted in the fluid chamber, wherein the vane is connected to the second longitudinal end.

15. A vehicle having a rotary hinge assembly, comprising:
   a vehicle door;
   a fixed adapter connected to a body part of the vehicle;
   a fluid chamber connected with the fixed adapter and filled with a fluid and comprising a constricted section with a throat area;
   a throat tuner comprising a strip structure connected in a region of the throat area of the constricted section, wherein the throat area is being tunable by sliding the strip structure of the throat tuner to one of various positions to control the fluid flow passing through the constriction section;
   a rotary connecting pin mounted within the fluid chamber, wherein the rotary connecting pin comprises:
      a first longitudinal end connected to the vehicle door to provide the rotational movement to the rotary connecting pin in response to opening and closing of the vehicle door; and
      a second longitudinal end concentrically and rotatably mounted in the fluid chamber; and
   a vane connected to the second longitudinal end of the rotary connecting pin, wherein the vane rotates to displace the fluid present in the fluid chamber towards the constricted section when the rotary connecting pin undergoes the rotational movement in response to opening and closing of the vehicle door.

16. The vehicle as claimed in claim 15, wherein the throat tuner is one of a nut-screw operated throat tuner, a ball-lock operated throat tuner, and a solenoid operated throat tuner.

17. The vehicle as claimed in claim 15, wherein the fluid chamber is disposed radially with respect to a central axis of the rotary hinge assembly, and wherein the fluid chamber comprises one or more constricted sections.

18. The vehicle as claimed in claim 15, wherein the vane is radially extending along cylindrical inner peripheral surface of the fluid chamber, and wherein the vane is in sliding contact with the inner peripheral surface of the fluid chamber when the vane and the fluid chamber undergo relative rotation in response to closing and opening of the vehicle door.

19. The vehicle as claimed in claim 15, wherein the vane rotates between an opened position of the vehicle door and closed position of the vehicle door defined by an open vane limiter and a close vane limiter mounted in the fluid chamber, and wherein the fluid chamber comprising an expanded portion near the close vane limiter for allowing the fluid flow during the closed position of the vehicle door to enhance the locking of the vehicle door.

20. The vehicle as claimed in claim 15, wherein the vane comprises a number of one-way valves to facilitate higher rate of the fluid flow during opening of the vehicle door in comparison to closing of the vehicle door.

\* \* \* \* \*